(12) United States Patent
LaCroix

(10) Patent No.: US 7,104,722 B2
(45) Date of Patent: Sep. 12, 2006

(54) MANHOLE COVER

(76) Inventor: Barry LaCroix, 60 Sour Springs Road, Brantford, Ontario (CA) N3T 5L6

(*) Notice: Subject to any disclaimer, the term of this patent is extended or adjusted under 35 U.S.C. 154(b) by 0 days.

(21) Appl. No.: 10/834,220

(22) Filed: Apr. 29, 2004

(65) Prior Publication Data

US 2005/0244226 A1    Nov. 3, 2005

(51) Int. Cl.
E02D 29/14 (2006.01)
B65D 43/14 (2006.01)
B65D 43/16 (2006.01)
B65D 43/22 (2006.01)

(52) U.S. Cl. .............. 404/25; 52/19; 220/844; 220/848

(58) Field of Classification Search ............... 404/25, 404/26; 292/256.65, 600, 601; 220/844, 220/848; 52/19
See application file for complete search history.

(56) References Cited

U.S. PATENT DOCUMENTS 3,209,938 A * 10/1965 De Frees .................. 220/260
5,193,864 A *  3/1993 Coleman ............... 292/256.67
5,715,965 A *  2/1998 Goulding ................. 220/321
6,066,237 A *  5/2000 Kindersley ............... 202/242
6,199,414 B1* 3/2001 Chang ..................... 70/168

* cited by examiner

*Primary Examiner*—Raymond W. Addie

(57) ABSTRACT

A manhole cover includes a cylindrical manhole including manhole lugs, wherein the manhole lugs extend around the upper outer periphery of the manhole; the cover includes cover lugs, the cover lugs extend around the outer periphery of the cover. The cover co-operatively mates with and closes off the manhole. A strap also extends around the cover and manhole lugs such that applying tension to the strap assembly forceably urges together the cover and manhole lugs wherein the strap for clamping together the manhole lugs to the cover lugs thereby placing cover into a sealed position.

10 Claims, 6 Drawing Sheets

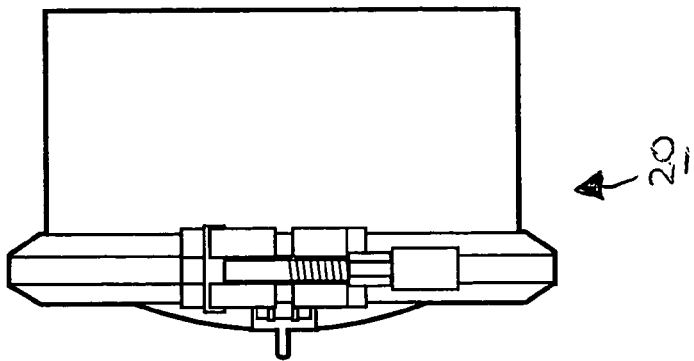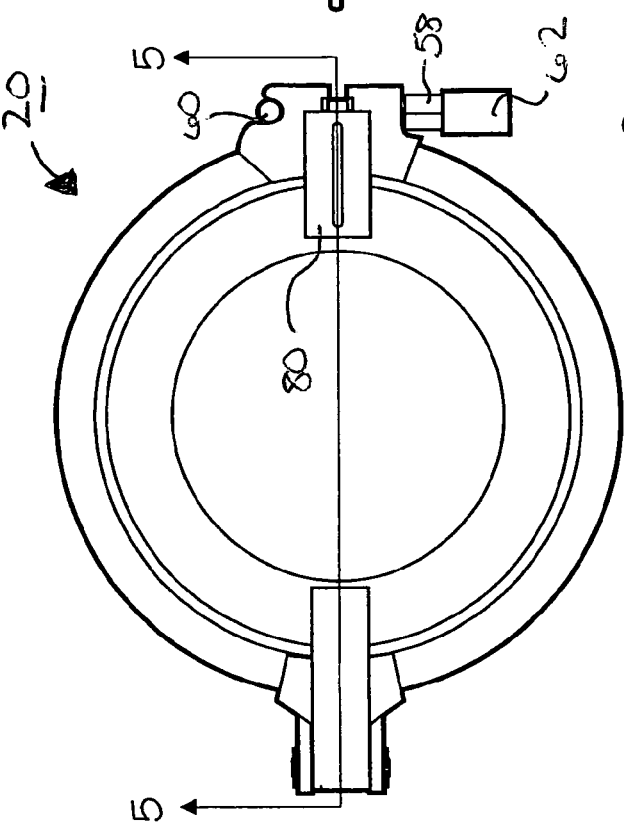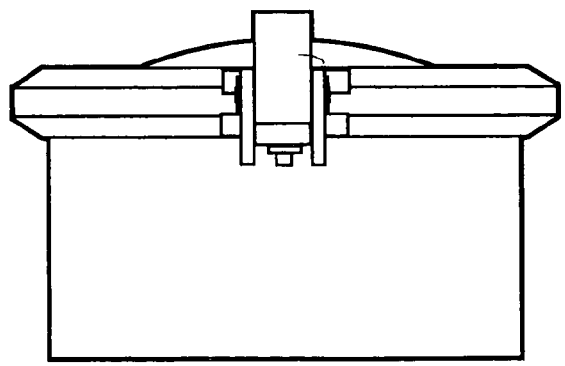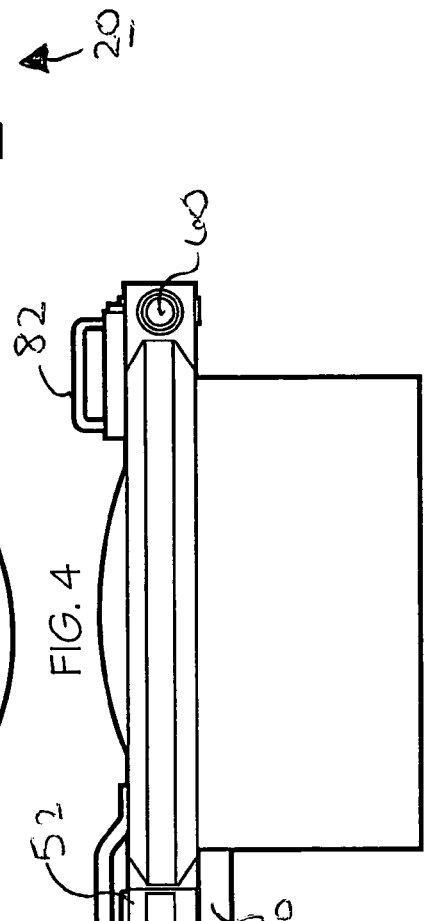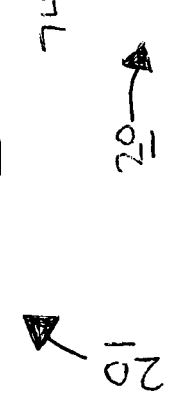

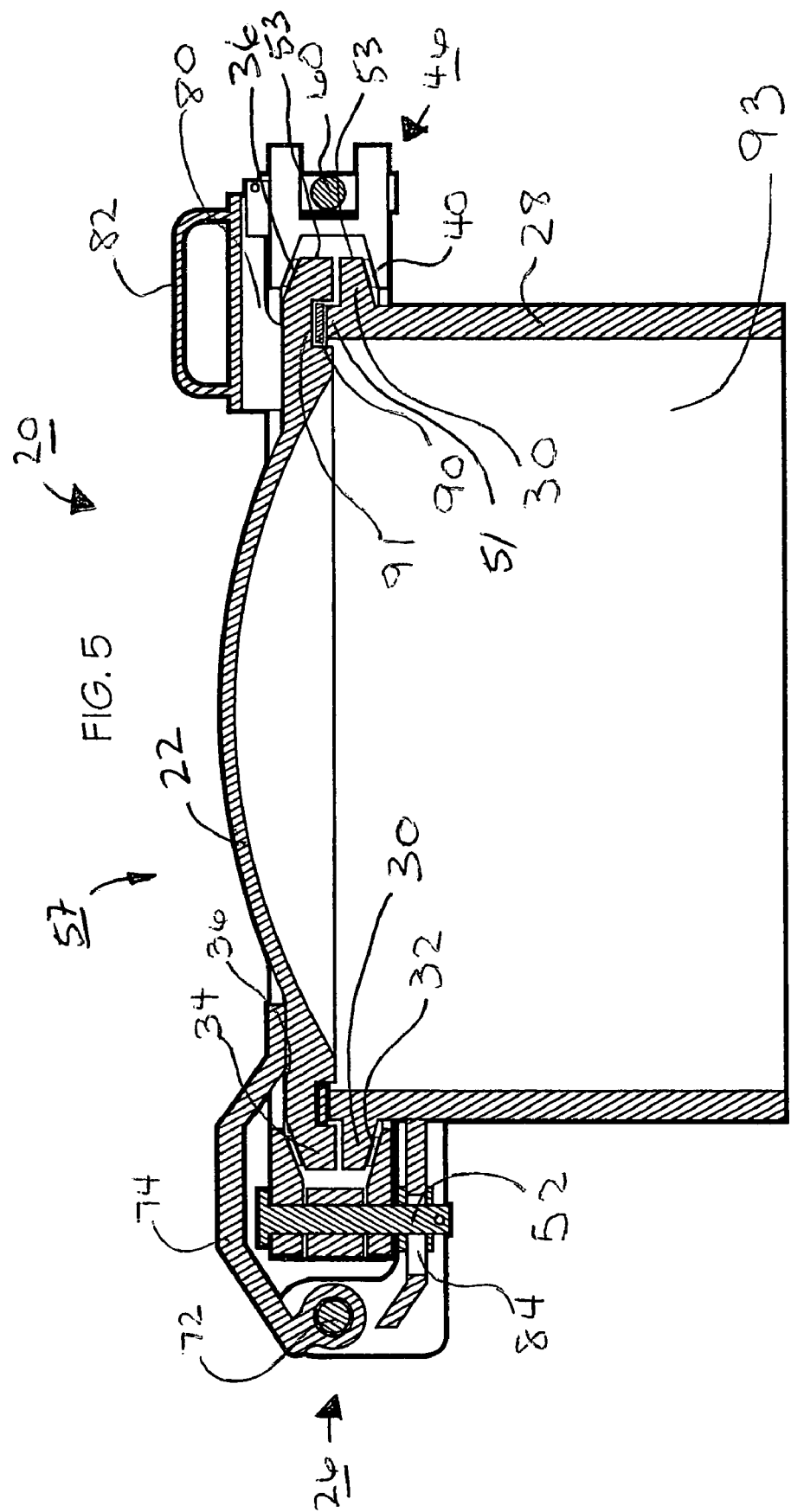

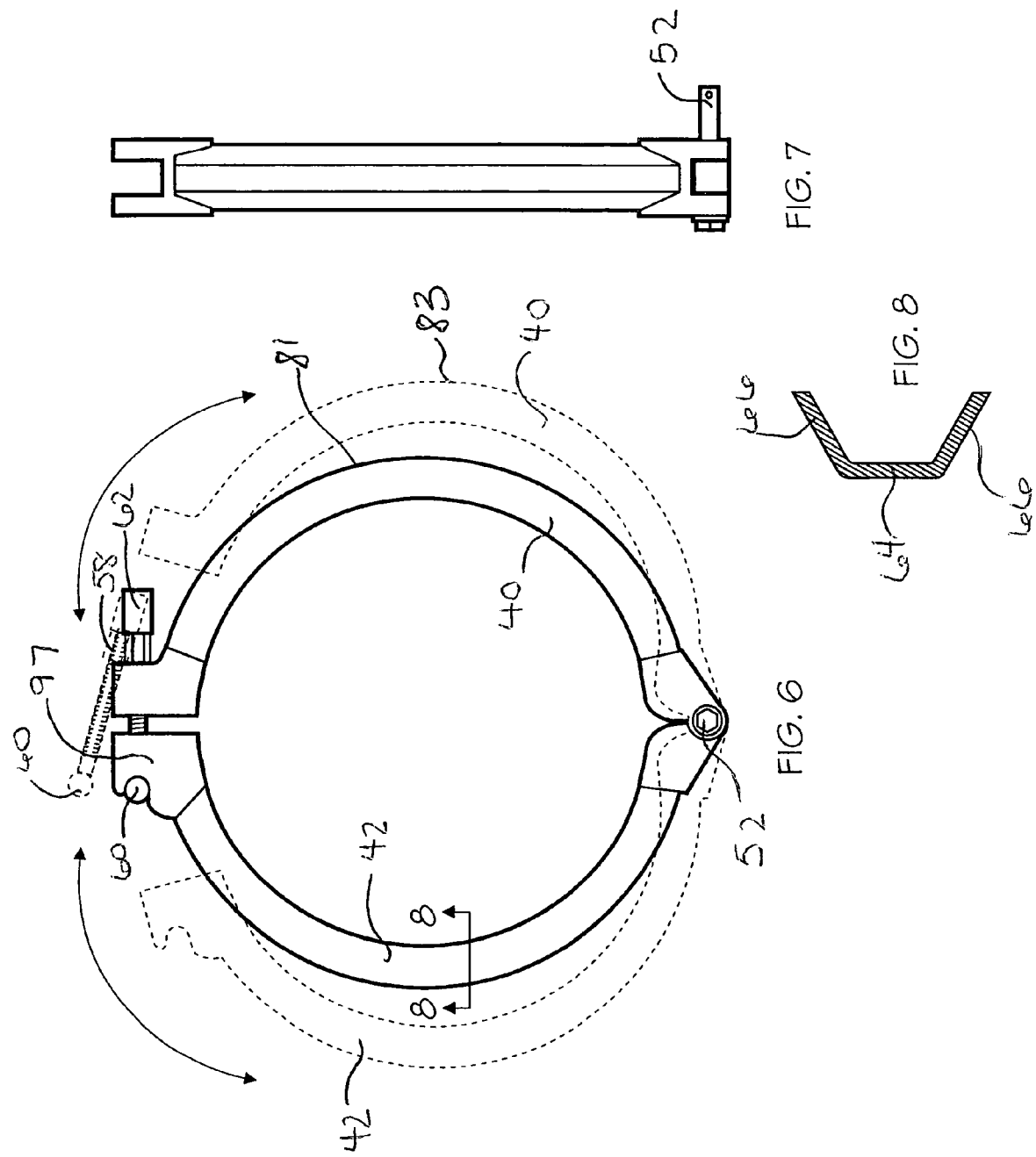

MANHOLE COVER

FIELD OF THE INVENTION

The present invention relates to manhole covers for pressure vessels and in particular relates to a manhole cover for a railway car pressure vessel.

BACKGROUND OF THE INVENTION

Currently manhole covers on railway pressure vessels are large, heavy steel plate circular covers which are bolted down with six to eight large eye bolts. The eye bolts that are used are a source of maintenance in that the bolts often break, the threads wearing, the nuts seize. In addition the installation and removal of the cover with the eye bolts is labour intensive, requiring a substantial amount of time in order to open and close the existing manhole covers.

Furthermore, the eye bolts securing the man whole cover are normally standing straight up with the threads exposed to the impact from tools, loading equipment and possible contact with the ground and other obstacles in the event of derailment of the rail car should the vessel overturn. Leaking of the pressure vessel can occur when an eye bolt is damaged or missing or the cover is incorrectly tightened or when the cover is permanently deformed from over tightening.

All of the above deficiencies in the existing manhole cover designs are the leading cause of commodity leaks in the north American rail car fleet.

Therefore, there is a need for a new and improved manhole cover locking system which overcomes the deficiencies of the current manhole cover designs and in particularly eliminates the need for six to eight large eye bolts which are positioned vertically upward from the cover.

SUMMARY OF THE INVENTION

A manhole cover comprising:
(a) a manhole including manhole lugs;
(b) a cover including cover lugs, said cover co-operatively mating with said manhole;
(c) a strap means for clamping together said manhole lugs and cover lugs, by applying tension to said strap means.

Preferably wherein said clamping means including a strap which extends around said cover and manhole lugs such that applying tension to said strap forceably urges together said cover and manhole lugs thereby placing cover into a sealed position.

Preferably wherein said clamping means including a strap assembly having a left and right strap, each strap pivotally connected at one end to a hinge means for pivotally connecting said left and right strap, and each strap connected at the other end to a tightening means for applying tension to said straps for forceably urging together said cover and manhole lugs thereby placing cover into a sealed position and straps in a locked position, and by releasing said tightening means for releasing tension on said straps such that they can pivot freely away from each other into an unlocked position.

Preferably wherein said hinge means including a strap hinge pin operatively connected to each strap for pivotally connecting said straps.

Preferably wherein said hinge means includes a strap hinge assembly including a left hinge bracket attached to one end of said left strap, and a right hinge bracket attached to one end of said right strap, and further including a strap hinge pin pivotally connecting said hinge brackets.

Preferably wherein said tightening means including a bolt and nut operatively connected to said straps for applying tension to said straps when said nut is tightened onto said bolt.

Preferably wherein said tightening means including a bolt bracket assembly including a bolt left bracket attached to said left strap and a bolt right bracket attached to said right strap and a bolt and nut for applying tension to said straps when said nut is tightened onto said bolt.

Preferably, wherein said bolt left bracket including a T bolt saddle for receiving a T bolt therein.

Preferably wherein said cover lugs and manhole lug each including a chamfered surface corresponding to a V shaped strap chamfered portion such that applying tension to said straps imparts compressive forces urging together said cover and manhole lugs.

Preferably further including a pivoting means for pivoting of said cover between a sealed position and an open position.

Preferably wherein said pivoting means including a cover hinge pin operably pivotally connecting said cover to said manhole.

Preferably wherein said pivoting means including a cover hinge flange connected to said cover and at least one cover hinge bracket connected to said manhole, and a cover hinge pin operably pivotally connecting said cover hinge flange to said hinge brackets.

Preferably further including a means for longitudinally sliding said clamping means away from said manhole when said straps in said unlocked position.

Preferably wherein said sliding means including a slot defined in a spacer plate which is attached to said manhole such that said hinge pin is slidably received within said longitudinally oriented slot thereby allowing said clamping means to be moved longitudinally to a cleared position.

Preferably wherein said slot oriented such that when said clamping means urged longitudinally backwards along said slot said straps clear said manhole and cover lugs to a cleared position, permitting said cover to be pivoted to an open position.

BRIEF DESCRIPTION OF THE DRAWINGS

The invention will now be described by way of example only with reference to the following drawings in which:

FIG. 1 is a left side, side elevational view of the manhole cover shown in FIG. 2.

FIG. 2 is a top plan view of the manhole cover.

FIG. 3 is a right side, side elevational view of the manhole covers shown in FIG. 2.

FIG. 4 is a front side, side elevational view of the manhole cover shown in FIG. 2.

FIG. 5 is a cross sectional schematic view of the manhole cover fastened down to a manhole.

FIG. 6 is a top plan schematic view of the locking strap together with the hinge assembly as well as the bolt bracket assembly wherein the strap is shown in an open position in dashed lines and in the closed position in solid lines.

FIG. 7 is a side elevational view of the locking strap shown in FIG. 6.

FIG. 8 is a cross sectional view of the locking strap taken along the lines 8—8 of FIG. 6.

DETAILED DESCRIPTION OF THE PREFERRED EMBODIMENT

Figure 9:
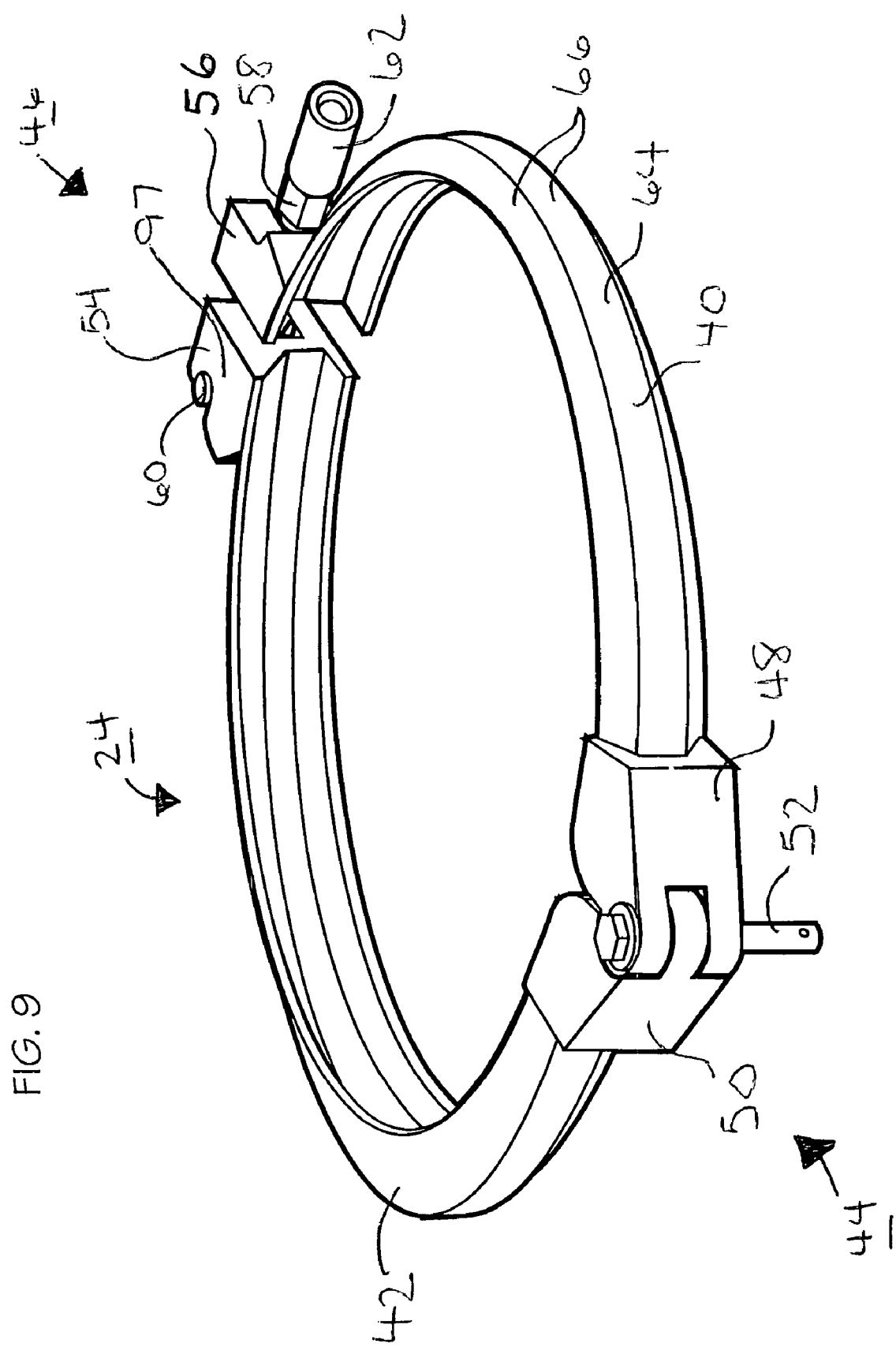
FIG. 9 is a top schematic perspective view of the locking strap together with the strap hinge assembly and the bolt bracket assembly.

The present invention, a manhole cover shown generally as 20 includes the following major components namely, cover plate 22, strap assembly 24, cover hinge assembly 26 bolt bracket assembly 46 and manhole walls 28.

Manhole walls 28 includes manhole lugs 30 extending around the upper outer periphery 53 of manhole 93, and having a manhole chamfered surface 32 for engaging with strap assembly 24.

Cover plate 22 includes cover lug 34 extending around an outer periphery 53 of cover plate 22, having a cover chamfered surface 36 for engaging with strap assembly 24.

Referring now particularly to FIG. 9 showing strap assembly 24, includes a right strap 40, a left strap 42, a strap hinge assembly 44 and a bolt bracket assembly 46. Right strap 40 and left strap 42 are hingeably connected at one end with strap hinge assembly 44 which includes a right hinge bracket 48, a left hinge bracket 50 and a strap hinge pin 52. Right strap 40 and left strap 42 are rigidly connected to right hinge bracket 48 and left hinge bracket 50 respectively in any manner known in the art including welding, rivetting, bolting etc.

Strap assemble 24 can be tightened together with bolt bracket assembly 46 which includes bolt left bracket 54, bolt right bracket 56, T-bolt 60, bolt nut 58, and sleeve 62.

Referring to FIGS. 6, 7 and 8, right strap 40 and left strap 42 include a vertical strap portion 64 and an upper and lower chamfered portion 66 creating V shaped chamfered. surfaces.

Figure 10:
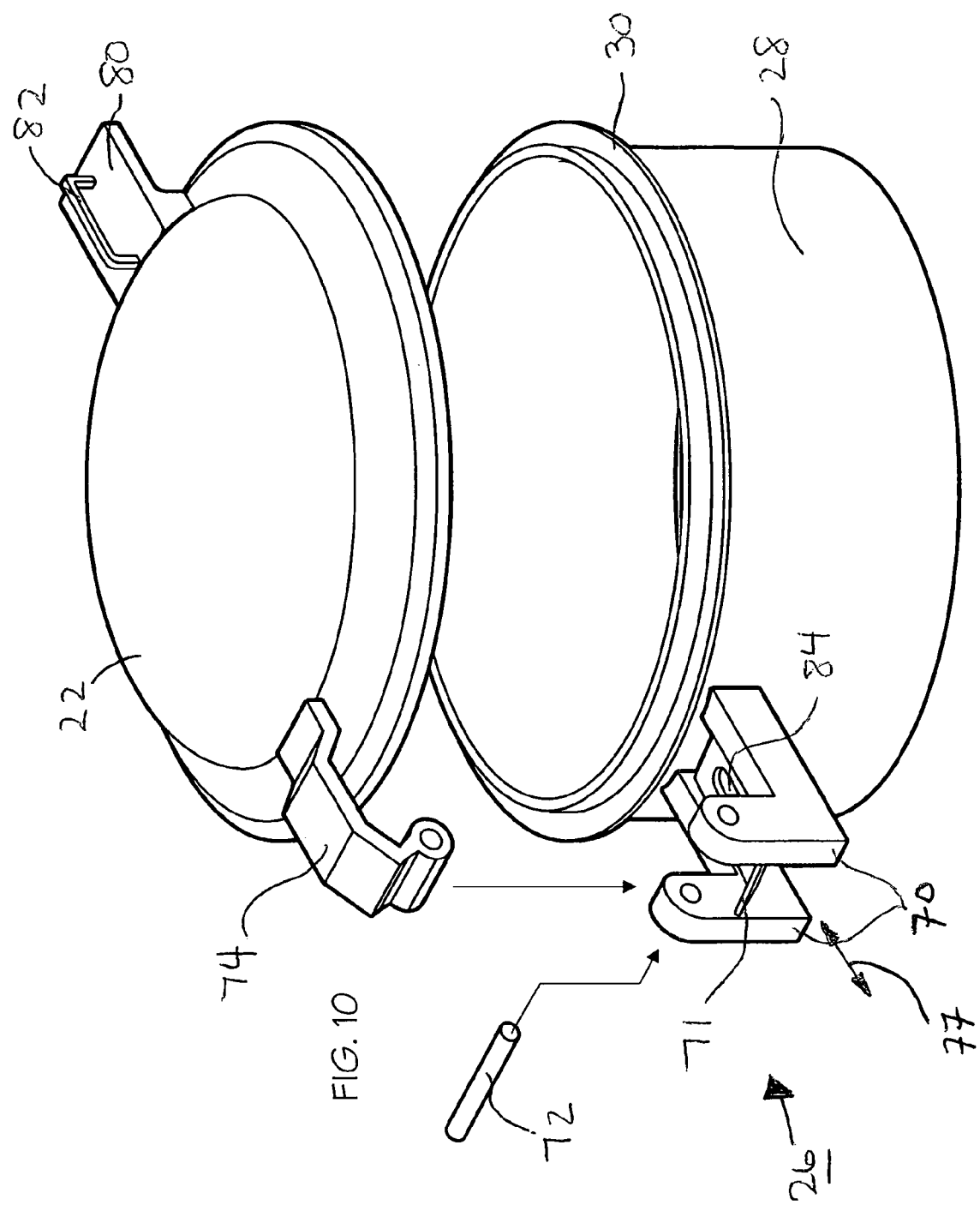
FIG. 10 is an exploded schematic assembly view of the manhole together with portions of the cover hinge assembly, the cover plate handle and handle flange.

Referring now to FIG. 10 which shows the details of cover hinge assembly 26. Cover hinge assembly 26 includes two cover hinge brackets 70, separated by spacer plate 71, a cover hinge 72 and a cover hinge flange 74 which is rigidly connected at one end to cover plate 22.

The other end of cover plate 22 includes a handle flange 80 having a handle 82 mounted rigidly thereon. Spacer plate 71 also includes a slot 84 for receiving strap hinge pin 52 there through, such that strap hinge pin 52 can slideably move along slot 84 when opening and closing strap assembly 24, thereby allowing the opening and closure of cover plate 22 of manhole cover 20.

Further referring now to FIG. 5, manhole cover 20 includes a cover gasket 90 which fits in between manhole walls 28 and cover plate 22, therefore providing an air and liquid tight seal once cover plate 22 is securely fastened down onto manhole walls 28. Gasket 90 seals onto sealing surface 51 of manhole walls 28.

In Use

Figure 11:
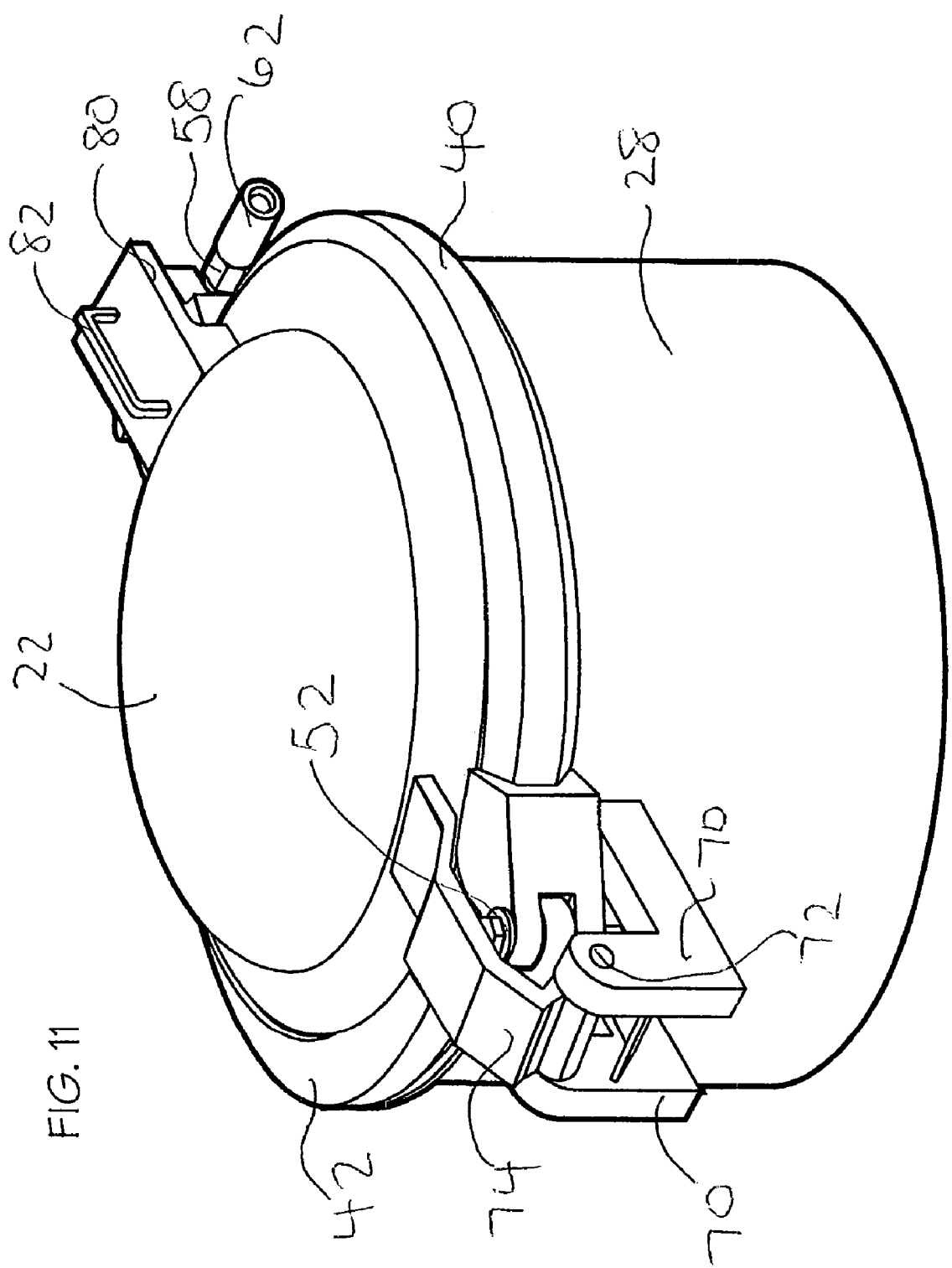
FIG. 11 is a top schematic perspective view of the manhole cover in its assembled condition showing the strap in the locked position.

Manhole cover 20 is used as follows:

Manhole cover 20 is shown in FIGS. 1 through 5 and also in FIG. 11 is shown in the closed position or sealed position 57. In FIG. 5 for example, cover plate 22 is shown seated against manhole walls 28 and sealed with a cover gasket 90. Sealing between cover plate 22 and manhole wall 28 is accomplished with either a hard gasket and/or an elastomeric gasket which fits in gasket groove 91 defined in cover plate 22. Other sealing means can be used as known in the art.

Closing Manhole Cover

In order to close manhole cover 20, onto manhole 93, cover plate 22 is rotated about cover hinge pin 72 until it makes contact with the top of manhole walls 28. Lying between cover plate 22 and manhole walls 28 is a cover gasket 90 fitted within a gasket groove 91 and is adapted to be retained within gasket groove 91 upon opening of cover plate 22.

Cover plate 22 has a cover hinge flange 74, rigidly connected to cover plate 22 at one end and is hinged onto cover hinge brackets 70, via cover hinge pin 72. On the other end of cover plate 22 is a handle flange 80 which is rigidly connected to cover plate 22, having a handle 82 mounted thereon. Urging handle 82 upwardly, one can open cover plate 22 removing it from manhole wall 28 and by pivoting cover plate 22 about cover hinge pin 72. One can lower cover plate 22 onto manhole wall 28, thereby creating a seal with cover gasket 90 between cover plate 22 and manhole 93.

Once cover plate 22 is in the closed or sealed position 57 as shown in FIG. 5, a strap assembly 24 is mounted in position around manhole lugs 30 as well as cover lugs 34.

Strap assembly 24 is best shown in FIG. 9, and includes a right strap 40 and left strap 42 which are hingeably connected at strap hinge assembly 44 which includes a left hinge bracket 50 and right hinge bracket 48, such that the left and right straps 42 and 40 respectively pivot about strap hinge pin 52.

Referring now specifically to FIGS. 6, 7 and 8, one will see that right strap 40 and left strap 42 have a vertical strap portion 64 and two chamfered strap portions 66. The chamfered portions 66 register and co-operatively make contact with chamfered surface 32 and cover camfered surface 36. This modified V configuration allows one to forceably compress cover plate 22 onto manhole walls 28 by constricting right strap 40 and left strap 42 around the outer circumference of cover lugs 34 and manhole lugs 30.

On the end distal from strap hinge assembly 44 is a bolt bracket assembly 46 which includes a bolt right bracket 56 for right strap 40 and bolt left bracket 54 for left strap 42. Bolt left bracket 54 also defines a T bolt saddle 97 which receives T bolt 60 and bolt right bracket 56 receives bolt nut 58 and a sleeve 62 wherein sleeve 62 covers over any exposed threads of T bolt 60. T bolt 60 preferably has acme threads defined thereon which cooperatively engage with bolt nut 58. Any excessive length of T bolt 60 is covered with a sleeve 62, thereby protecting any exposed threads from damage. Tightening bolt nut 58, forceably urges bolt left bracket 54 together with bolt right bracket 56, thereby imparting constrictive forces on right strap 40 and left strap 42, thereby forceably urging cover plate 22 onto cover gasket 90 which applies increasing pressure onto manhole walls 28, thereby providing a fluid proof seal.

In this manner by simply tightening one bolt, namely bolt nut 58, the entire closing and sealing mechanism is accomplished.

Opening Cover Plate 22

In order to open cover plate 22, from the locked position 81 shown in dark lines in FIG. 6 the reverse procedure of the above described is carried out. Firstly, bolt nut 58 is loosened off, thereby loosening the tension in right strap 40 and left strap 42. Right strap 40 and left strap 42 pivot away from each other about strap hinge pin 52. When bolt nut 58 is eased off far enough, it is possible to dislodge T bolt 60 from T bolt saddle 97 which is defined in bolt left bracket 54.

As shown in FIG. 6, T bolt 60 is dislodged from T bolt saddle 97 allowing further pivoting of right strap 40 from left strap 42 to the position as shown in dotted lines in FIG. 6 which is the unlocked position 83. Further to ensure that right strap 40 and left strap 42 completely clear manhole lugs 30 and cover lugs 34, one can then forceably urge the entire strap assembly 24 rearwardly towards cover hinge assembly 26 by slideably urging strap hinge pin 52 longitudinally backwards along slot 84 along longitudinal direction 77 to a cleared position not shown. Once right strap 40 and left strap 42 have cleared manhole lugs 30 and cover lugs 34 completely, it is possible to hingeable lift cover plate 22 about cover hinge pin 72, thereby pivoting manhole cover 20 from the sealed position 57 to an open position not shown.

It should be apparent to persons skilled in the arts that various modifications and adaptation of this structure described above are possible without departure from the spirit of the invention the scope of which defined in the appended claim.

I claim:

1. A manhole cover comprising:
   (a) a cylindrical manhole including manhole lugs, wherein said manhole lugs extending around the upper outer periphery of said manhole;
   (b) a cover including cover lugs, said cover lugs extending around the outer periphery of said cover, said cover for co-operatively mating with and closing off said manhole;
   (c) a means for clamping together said manhole lugs to said cover lugs thereby placing cover into a sealed position:
   (d) wherein said clamping means including a strap assembly having a left and right strap, each strap pivotally connected at one end to a hinge means for pivotally connecting said left and right strap, and each strap connected at the other end to a tightening means for applying tension to said straps for forceably urging together said cover and manhole lugs thereby placing cover into a sealed position and straps in a locked position, and by releasing said tightening means for releasing tension on said straps such that they can pivot freely away from each other into an unlocked position
   (e) wherein said hinge means including a strap hinge pin operatively connected to each strap for pivotally connecting said straps;
   (f) further including a means for longitudinally sliding said clamping means away from said manhole when said straps are in said unlocked position;
   (g) wherein said sliding means including a slot defined in a spacer plate which is attached to said manhole such that said hinge pin is slidably received within said longitudinally oriented slot thereby allowing said clamping means to be moved longitudinally to a cleared position.

2. The manhole cover claimed in claim 1, wherein said hinge means includes a strap hinge assembly including a left hinge bracket attached to one end of said left strap, and a right hinge bracket attached to one end of said right strap, and further including a strap hinge pin pivotally connecting said hinge brackets.

3. The manhole cover claimed in claim 1, wherein said tightening means including a bolt and nut operatively connected to said straps for applying tension to said straps when said nut is tightened onto said bolt.

4. The manhole cover claimed in claim 1 wherein said cover lugs and manhole lug each including a chamfered surface corresponding to a V shaped strap chamfered portion such that applying tension to said straps imparts compressive forces urging together said cover and manhole lugs.

5. The manhole cover claimed in claim 1, wherein said slot oriented such that when said clamping means urged longitudinally backwards along slot said straps clear said manhole and cover lugs to a cleared position, permitting said cover to be pivoted to an open position.

6. The manhole cover claimed in claim 1, wherein said tightening means including a bolt bracket assembly including a bolt left bracket attached to said left strap and a bolt right bracket attached to said right strap and a bolt and nut for applying tension to said straps when said nut is tightened onto said bolt.

7. The manhole cover claimed in claim 6, wherein said bolt left bracket including a T bolt saddle for receiving a T bolt therein.

8. The manhole cover claimed in claim 1, further including a pivoting means for pivoting of said cover between a sealed position and an open position.

9. The manhole cover claimed in claim 8, wherein said pivoting means including a cover hinge pin operably pivotally connecting said cover to said manhole.

10. The manhole cover claimed in claim 8, wherein said pivoting means including a cover hinge flange connected to said cover and at least one cover hinge bracket connected to said manhole, and a cover hinge pin operably pivotally connecting said cover hinge flange to said hinge brackets.

* * * * *